July 18, 1944.　　　J. G. OETZEL　　　2,353,749

ELECTROMAGNETIC FRICTION DEVICE

Filed Dec. 3, 1941

INVENTOR.
JOHN GEORGE OETZEL
BY
Parker, Carlson, Pitzner Hubbard
ATTORNEYS

Patented July 18, 1944

2,353,749

UNITED STATES PATENT OFFICE 2,353,749

ELECTROMAGNETIC FRICTION DEVICE

John George Oetzel, Beloit, Wis., assignor to Warner Electric Brake Manufacturing Company, South Beloit, Ill., a corporation of Illinois Application December 3, 1941, Serial No. 421,441

16 Claims. (Cl. 188—138)

This invention relates to improvements in electromagnetic friction devices, particularly those comprising an annular magnet having concentric poles with faces terminating at an axial friction surface adapted for gripping engagement with a flat armature ring.

One object of the present invention is to provide a novel construction of the magnetic circuit providing a substantially linear relationship between the energizing current and the attractive force developed thereby.

Another object is to adapt the magnet for operation at comparatively high temperatures without danger of warping of its friction face.

The invention also resides in the novel character of the construction by which the foregoing objects are attained.

Other objects and advantages of the invention will become apparent from the following detailed description taken in connection with the accompanying drawing, in which Figure 1 is a fragmentary sectional view of an electrically controlled brake having a friction device embodying the features of the present invention, the section being taken along the line 1—1 of Fig. 2.

Figure 4:
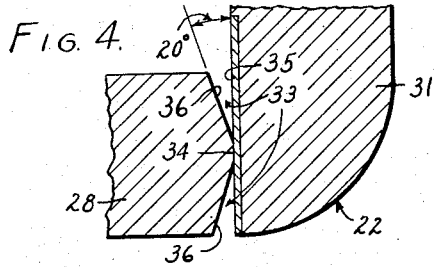
Fig. 4 is an enlarged view showing the magnet air gap.

While the invention is susceptible of various modifications and alternative constructions, I have shown in the drawing and will herein describe in detail the preferred embodiment. It is to be understood, however, that I do not intend to limit the invention by such disclosure but aim to cover all modifications and alternative constructions falling within the spirit and scope of the invention, as expressed in the appended claims.

In the drawing, the invention is embodied for purposes of illustration in a brake adapted to be applied to a vehicle and comprising generally a rotatable drum 10 and friction shoes 11 extending around the inner drum surface for expansion into gripping engagement therewith. The shoe ends are disposed adjacent each other and normally drawn by springs 12 against stops 13 rigid with a non-rotatable anchor member 14. Mounted on a pivot 15 between the stops is a lever 16 carrying a stud 17 disposed between the ends of brackets 18 on the shoes and operable upon swinging of the lever in either direction away from the normal brake-released position shown to move one shoe end or the other away from its stop and thereby expand the shoes to apply the brake.

The friction device in which the present invention is embodied includes an armature ring 20 having a flat inwardly facing friction surface and supported concentric with the drum axis and for a limited degree of floating axial movement. The mounting is provided with a plurality of flexible metal strips 21 arranged as secants of the armature ring with their opposite ends secured to the drum flange 10ª and the armature ring respectively. The magnet comprises a ring 22 of magnetic material and of U-shaped cross-section having an annular winding 23 disposed between two poles 24 whose radially spaced faces 25 are in a common plane. A flat ring or segment 26 of friction material is supported between the poles with its friction face substantially flush with the pole faces so as to sustain the major burden of the gripping engagement between the magnet and armature and thereby minimize wearing off of the pole faces. Lugs 27 rigid with the back of the magnet ring lie on opposite sides of a pin 27ª on the inner end of the lever 16.

Setting of the brake as above described takes place whenever the winding 23 is energized with the drum rotating. This produces a magnetic flux of high intensity in the closed magnetic circuit around the winding and the resulting gripping engagement between the friction faces of the magnet and armature is proportional to the strength of the energizing current. The magnet ring is thus driven frictionally by the armature ring, thereby moving with the wheel through a short angular distance. In this movement, one of the lugs 27 swings the lever 16 in the direction of drum rotation moving one shoe end 18 away from its anchor to expand the band against the drum. After the normal clearance has been taken up, slippage occurs between the faces of the magnet and armature rings and the brake remains applied so long as the magnet is energized. When the current flow is interrupted, the springs 12 contract the shoes and restore these and the magnet ring to the normal brake-released position shown.

In the present instance, the magnet is composed of two parts, one forming the inner pole and comprising a cylindrical ring 28 mounted to rotate on a bearing ring 29 supported by a flange 30 on the anchor member 14. The other magnet part is a ring 31 generally L-shaped in cross-section with one edge portion forming the outer magnet pole and the other extending at right angles to and overlapping the edge of the ring 28. The two rings are rigidly secured together by an annular bronze weld 32. The winding 23 is embedded in hardened insulating material which may be flowed into the magnet cavity.

Figure 5:
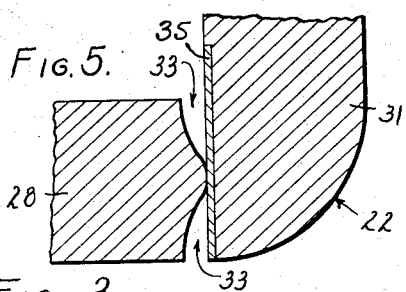
Fig. 5 is a similar view showing a modified form of air gap.
Figure 1:
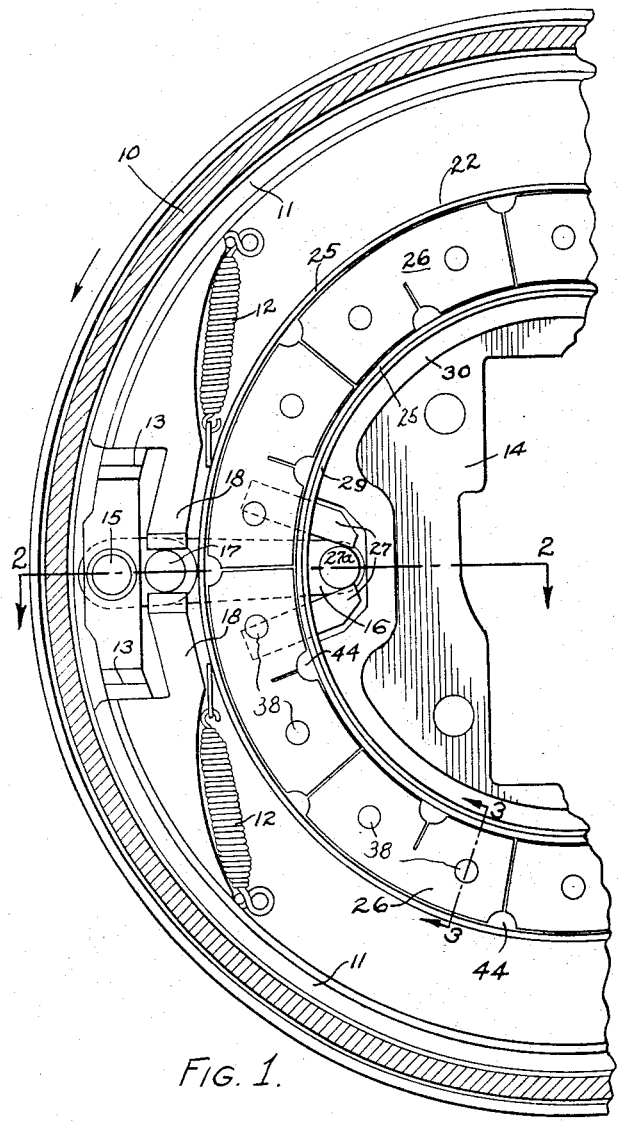
Figure 3:
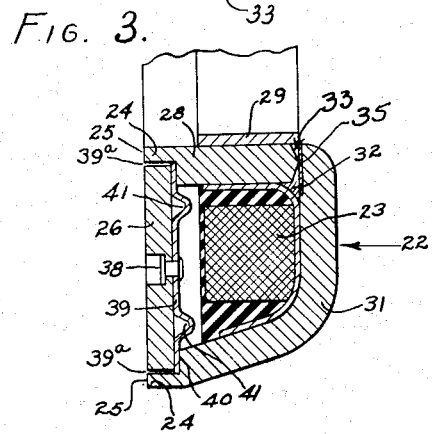
Fig. 3 is an enlarged cross-sectional view of the magnet taken along the line 3—3 of Fig. 2.
Figure 6:
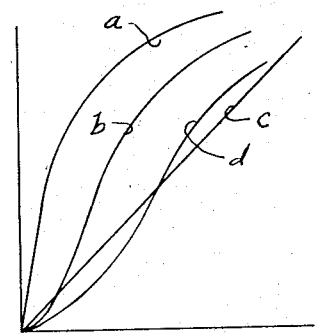
Fig. 6 shows characteristic curves of magnets having different air gap shapes.
Figure 2:
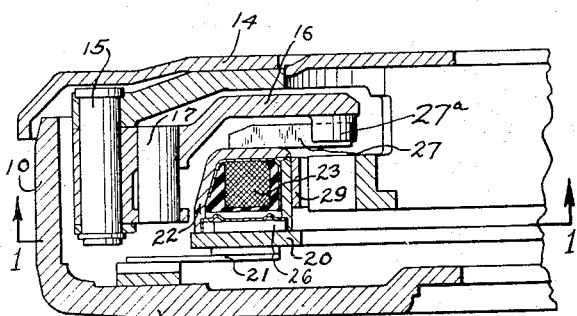
Fig. 2 is a fragmentary sectional view taken along the line 2—2 of Fig. 1.

One or more annular air gaps of special cross-sectional shape and designated generally at 33 are interposed in the magnetic circuit through the magnet poles and armature and around the winding 23. Preferably, this gap is located at the junction between the two magnet rings 28 and 31 and, generally stated, tapers edgewise in one or both directions from an annular line 34 of contact between one of the rings and a thin shim 35 of non-magnetic material introduced into the magnetic circuit to dissipate residual magnetism. Without such a tapering air gap, the permeability curve of the magnet would be shaped approximately as indicated at $a$ in Fig. 6. The introduction of the shim 35 shifts the curve slightly without varying its shape materially as indicated at $b$. To produce a truly straight magnetization curve as indicated at $c$, the tapering surfaces defining the air gaps would be curved approximately as shown in Fig. 5, but this particular shape will vary according to the characteristics of the magnetic material. A magnetization curve $d$ which is sufficiently linear for use in friction devices of the character shown may be obtained and manufacture of the magnet facilitated by making the shim 35 flat and beveling the edge of the ring 28 to produce flat surfaces 36 tapering in opposite directions from the line 34 with the shim. A taper of approximately twenty degrees has been found satisfactory for this purpose, the line 34 of contact being approximately $\frac{1}{32}$ of an inch wide. With the magnet thus constructed, the attractive force produced is substantially a linear function of the energizing current so that the attractive force may be gauged accurately over the full operating range as by moving the operating member of a rheostat controller or the like.

Under certain conditions of service use of friction devices of the above character, the magnet parts may become heated to temperatures above that at which ordinary friction materials begin to deteriorate. For such applications, it is desirable to construct the friction material 26 of sintered bronze material such as so-called Wellman metal or Johnson bronze. To prevent warping of this ring and also to allow for relative lateral movement between the poles as an incident to heating and cooling of the magnet through a substantial temperature range, a special mounting is provided. As shown herein, the friction ring comprises an annular series of flat segments each secured at circumferentially spaced points to the center of a sheet metal ring 39 of monel metal or the like, in the present instance, the attachment being formed by rivets 38 countersunk in the segments. The radial width of the segments 26 is somewhat less (about .02) than the spacing of the pole faces 25 so as to provide clearances 39ª which allow for the proper amount of lateral movement between the poles as an incident to heating and cooling of the magnet. The radial width of the ring 39 is equal to that of the poles and its outer marginal edges are seated on shoulders 40 on the magnet poles to which the edges are spot or arc-welded at annular spaced points. The welding electrode is inserted through recesses 44 formed herein by cutting away the outer corners of adjacent segments 26.

To permit of lateral movement between the poles, this ring is constructed for radial contraction and expansion. In the present instance, this is accomplished by deforming the ring 39 to provide annular ribs 41 which permit of edgewise compression and expansion of the ring which is thus adapted to accommodate any movement of the magnet poles toward or away from each other during heating and cooling. Warping of the friction face of the magnet even under extreme temperature changes is eliminated with the friction material 26 thus constructed and mounted.

The construction including the gap 39ª for permitting freedom of thermal expansion of the inner magnet pole apart from the combination with the inner supporting ring 39 forms the subject matter of my co-pending application Serial No. 489,918, filed June 7, 1943, and the claims hereof are subordinate to those of said application.

I claim as my invention:

1. An electromagnetic friction device combining a magnet ring having an annular friction face with two pole faces substantially flush therewith, an armature ring adapted to be brought into gripping engagement with said friction face upon energization of the magnet and coacting with said magnet ring to form a substantially closed flux circuit, and means in said flux circuit providing an air gap defined by straight sided walls diverging relative to each other transversely of said magnetic circuit.

2. An electromagnetic friction device combining a magnet ring having an annular friction face with two pole faces substantially flush therewith, an armature ring adapted to be brought into gripping engagement with said friction face upon energization of the magnet and coacting with said magnet ring to form a substantially closed flux circuit, and means in said flux circuit providing an air gap diverging in opposite directions from a line intermediate the edges of said circuit.

3. An electromagnetic friction device combining a magnet ring having an annular friction face with two pole faces substantially flush therewith, an armature ring adapted to be brought into gripping engagement with said friction face upon energization of the magnet and coacting with said magnet ring to form a substantially closed flux circuit, and means in said flux circuit providing an air gap tapering transversely of the magnet circuit.

4. An electromagnetic friction device combining a magnet ring having a flat annular friction face with two concentric pole faces substantially flush therewith, a flat armature ring adapted to be brought into axial gripping engagement with said friction face upon energization of the magnet and coacting with said magnet ring to form a substantially closed flux circuit, and means in said flux circuit providing an air gap contoured to straighten the magnetization curve of the magnet and armature.

5. A magnet of the character described comprising a cylindrical ring, and a second ring of L-shaped cross-section having a straight side overlapping one edge of said first ring, the surface of said edge being beveled and coacting with the flat side of said second ring to define a tapering air gap in the flux circuit through the two rings.

6. A magnet of the character described comprising a cylindrical ring, a second ring of L-shaped cross-section overlapping one edge of said cylindrical ring, and means rigidly connecting said two rings to provide an annular air gap of tapering cross-section interrupting the magnetic flux circuit through the elements.

7. A magnet of the character described comprising a cylindrical ring, a second ring of L-shaped cross-section overlapping one edge of said cylindrical ring, and means rigidly connecting said two rings to provide an annular air gap therebetween converging outwardly in opposite directions from a point intermediate the sides of said first ring.

8. A magnet of the character described comprising a ring of U-shaped cross-section providing two spaced poles with axially facing ends, a ring of non-magnetic metal disposed between said poles and seated on shoulders thereon, and segments of friction material rigidly secured at annularly spaced points to said metallic ring and having a radial width less than the distance between said poles, said metallic ring having an annular bead formed therein to permit of edgewise contraction and expansion of the ring.

9. A magnet of the character described comprising a ring of U-shaped cross-section providing two spaced poles, a ring of non-magnetic metal disposed between said poles and seated on shoulders thereon, and friction material rigidly secured at annularly spaced points to said metallic ring and having a width less than the distance between said poles.

10. A magnet of the character described comprising a ring of U-shaped cross-section providing two spaced poles, a ring of non-magnetic metal disposed between said poles and rigidly secured thereto, said ring being deformed annularly to permit of edgewise thermal expansion and contraction, and friction material rigidly secured to said metallic ring and having a radial width less than the distance between said poles.

11. In an electromagnetic friction device, a magnetic element comprising two magnetic rings lying side by side in abutting relation and providing pole faces, the adjacent sides of said rings being spaced from said faces along the flux circuit and contoured to define a non-magnetic tapering gap.

12. A magnet comprising a ring of U-shaped cross-section providing two concentric pole pieces, a ring of friction material backed by said pole pieces and having a radial width less than the distance between the faces thereof, and a ring of non-magnetic metal supporting said friction ring and rigidly secured to said pole pieces while permitting freedom of thermal expansion and contraction of the friction ring.

13. A magnet comprising a ring of U-shaped cross-section providing two concentric pole pieces, a ring of friction material backed by said pole pieces, and having a radial width less than the distance between the faces thereof, a ring of non-magnetic metal supported by said pole pieces and rigidly secured intermediate its edges to said friction ring to permit freedom of thermal expansion of the latter, and means securing said edges of said metallic ring to said pole pieces to hold the rings against turning relative to the pieces.

14. An electromagnetic friction device comprising magnet and armature elements having opposed coacting faces and providing a substantially closed magnetic flux circuit with a non-magnetic gap therein spaced along the flux circuit from said faces, said gap having a cross-section of varying width and imparting substantial straightness to the magnetization curve of the device.

15. An electromagnetic friction device comprising magnet and armature elements movable relative to each other and having opposed faces adapted for frictional gripping engagement, said elements providing a substantially closed magnetic flux circuit having a non-magnetic gap included therein at a point spaced from said faces, said gap tapering transversely of said flux circuit.

16. An electromagnetic friction device comprising magnet and armature elements movable relative to each other and having opposed faces adapted for frictional gripping engagement, said elements providing a substantially closed magnetic flux circuit having a non-magnetic gap included therein at a point spaced from said faces, said gap diverging in opposite directions from a line intermediate the edges of said circuit.

JOHN GEORGE OETZEL.